US 6,707,778 B1

(12) United States Patent
Lin et al.

(10) Patent No.: US 6,707,778 B1
(45) Date of Patent: Mar. 16, 2004

(54) EDIT TO PICTURE WITHOUT DECODING AND RE-ENCODING OF MPEG BIT STREAM FOR RECORDABLE DVD

(75) Inventors: Shu Lin, Indianapolis, IN (US); Mark Alan Schultz, Carmel, IN (US); Yongmei Cang, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 440 days.

(21) Appl. No.: 09/662,811

(22) Filed: Sep. 15, 2000

Related U.S. Application Data (60) Provisional application No. 60/164,793, filed on Nov. 10, 1999.

(51) Int. Cl.[7] .............................................. G11B 27/00
(52) U.S. Cl. ........................................... 369/83; 386/52
(58) Field of Search ................................ 369/83, 47.13, 369/30.05, 30.19; 386/52, 109, 111, 112; 360/13

(56) References Cited

U.S. PATENT DOCUMENTS

| | | |
|---|---|---|
| 5,267,334 A | 11/1993 | Normille et al. |
| 5,535,008 A | 7/1996 | Yamagishi et al. |
| 5,787,224 A * | 7/1998 | Itoh et al. ................... 369/83 |
| 5,802,240 A * | 9/1998 | Asai ........................... 386/52 |
| 5,838,874 A * | 11/1998 | Ng et al. ..................... 386/96 |
| 5,862,110 A | 1/1999 | Yamamiya |
| 5,870,523 A | 2/1999 | Kikuchi et al. |
| 5,926,604 A | 7/1999 | Yanagihara et al. |
| 5,937,136 A | 8/1999 | Sato |
| 5,949,953 A | 9/1999 | Shirakawa et al. |
| 5,970,205 A | 10/1999 | Nakamura et al. |
| 5,999,696 A | 12/1999 | Tsuga et al. |
| 6,009,229 A | 12/1999 | Kawamura |
| 6,219,043 B1 * | 4/2001 | Yogeshwar et al. ........... 386/52 |
| 6,240,137 B1 * | 5/2001 | Kato ....................... 375/240.26 |
| 6,256,451 B1 * | 7/2001 | Mitsui ......................... 386/52 |

FOREIGN PATENT DOCUMENTS

| | | |
|---|---|---|
| EP | 0651391 | 5/1995 |
| EP | 0677961 | 10/1995 |
| EP | 0695098 | 1/1996 |
| EP | 0696798 | 2/1996 |
| EP | 0700221 | 3/1996 |
| EP | 0727912 | 8/1996 |
| EP | 0737975 | 11/1996 |
| EP | 0725399 | 7/1997 |
| EP | 0855714 A | 7/1998 |
| EP | 0903744 | 3/1999 |
| EP | 0926903 | 6/1999 |
| EP | 0956678 A | 6/1999 |
| EP | 0971535 | 1/2000 |
| EP | 1005042 A | 5/2000 |
| WO | WO99/38166 | 7/1999 |
| WO | WO00/02195 | 1/2000 |

OTHER PUBLICATIONS

Shiu, J. et al., "A Low–Cost Editor for MPEG–1 System Streams" IEEE Transactions on Consumer Electronics, US IEEE Inc. New York vol. 41 No. 3 Aug. 1995.

(List continued on next page.)

*Primary Examiner*—Thang V. Tran
(74) *Attorney, Agent, or Firm*—Joseph S. Tripoli; Harvey D. Fried; Francis A. Davenport (57) ABSTRACT

A method and device for editing to a picture a group of pictures (GOP) in a DVD media without decoding and encoding of an MPEG encoded signal. The method includes the steps of: marking a user selected end picture to identify a selected segment of the encoded signal to be edited; automatically identifying an actual end picture for the selected segment based on a position of the user selected end picture relative to at least one other picture within the encoded signal; and performing an edit function on an actual segment delimited by the actual end picture.

18 Claims, 6 Drawing Sheets

OTHER PUBLICATIONS

Hedtke, R. et al. "Schnittbearbeitung Von MPEG–2–Codierten Videosquenzen" Fernseh Uind Kinotechnik, VDE Verlag GmbH.Berlin, DE. vol. 50 No. 7, Jul. 1996.

Hurst, R. et al.: MPEG Splicing–Tutorial and Proposed SMPTE Standard Proceedings of the SMPTE Technical Conference, XX,XX Nov. 1997.

* cited by examiner

| USER SELECTED END PICTURE | ACTUAL LAST PICTURE |
|---|---|
| $B_0$ OR $B_1$ | PREVIOUS GOP |
| $I_2$ | $I_2$ |
| $B_3$ OR $B_4$ | $I_2$ |
| $P_5$ | $P_5$ |
| $B_6$ OR $B_7$ | $P_5$ |
| $P_8$ | $P_8$ |
| $B_9$ OR $B_{10}$ | $P_8$ |
| $P_{11}$ | $P_{11}$ |
| $B_{12}$ OR $B_{13}$ | $P_{11}$ |
| $P_{14}$ | $P_{14}$ |

FIG. 4

| USER SELECTED END PICTURE | ACTUAL END PICTURE AND GOP STRUCTURE |
|---|---|
| $B_0$ | $B_0$ $\underline{I_2}$ |
| $B_1$ | $B_0$ $B_1$ $\underline{I_2}$ |
| $I_2$ | $B_0$ $B_1$ $I_2$ |
| $B_3$ | $B_0$ $B_1$ $I_2$ $B_3$ $\underline{P_5}$ |
| $B_4$ | $B_0$ $B_1$ $I_2$ $B_3$ $B_4$ $\underline{P_5}$ |
| $P_5$ | $B_0$ $B_1$ $I_2$ $B_3$ $B_4$ $P_5$ |
| $B_6$ | $B_0$ $B_1$ $I_2$ $B_3$ $B_4$ $P_5$ $B_6$ $\underline{P_8}$ |
| $B_7$ | $B_0$ $B_1$ $I_2$ $B_3$ $B_4$ $P_5$ $B_6$ $B_7$ $\underline{P_8}$ |
| $P_8$ | $B_0$ $B_1$ $I_2$ $B_3$ $B_4$ $P_5$ $B_6$ $B_7$ $P_8$ |
| $B_9$ | $B_0$ $B_1$ $I_2$ $B_3$ $B_4$ $P_5$ $B_6$ $B_7$ $P_8$ $B_9$ $\underline{P_{11}}$ |
| $B_{10}$ | $B_0$ $B_1$ $I_2$ $B_3$ $B_4$ $P_5$ $B_6$ $B_7$ $P_8$ $B_9$ $B_{10}$ $\underline{P_{11}}$ |
| $P_{11}$ | $B_0$ $B_1$ $I_2$ $B_3$ $B_4$ $P_5$ $B_6$ $B_7$ $P_8$ $B_9$ $B_{10}$ $P_{11}$ |
| $B_{12}$ | $B_0$ $B_1$ $I_2$ $B_3$ $B_4$ $P_5$ $B_6$ $B_7$ $P_8$ $B_9$ $B_{10}$ $P_{11}$ $B_{12}$ $\underline{P_{14}}$ |
| $B_{13}$ | $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $\underline{P_{14}}$ |
| $P_{14}$ | $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $\underline{P_{14}}$ |

FIG. 5

| USER SELECTED FIRST PICTURE | ACTUAL FIRST PICTURE AND GOP STRUCTURE |
|---|---|
| $B_0$ $B_1$ | START AT $I_2$ |
| $I_2$ | START AT $I_2$ — $I_2$ $B_3$ $B_4$ $P_5$ $B_6$ $B_7$ $P_8$ $B_9$ $B_{10}$ $P_{11}$ $B_{12}$ $B_{13}$ $P_{14}$ |
| $B_3$ | START AT $I_2$ — $I_2$ $B_3$ $B_4$ $P_5$ $B_6$ $B_7$ $P_8$ $B_9$ $B_{10}$ $P_{11}$ $B_{12}$ $B_{13}$ $P_{14}$ |
| $B_4$ | START AT $I_2$ — $I_2$ $B_4$ $P_5$ $B_6$ $B_7$ $P_8$ $B_9$ $B_{10}$ $P_{11}$ $B_{12}$ $B_{13}$ $P_{14}$ |
| $P_5$ | START AT $I_2$ — $I_2$ $P_5$ $B_6$ $B_7$ $P_8$ $B_9$ $B_{10}$ $P_{11}$ $B_{12}$ $B_{13}$ $P_{14}$ |
| $B_6$ | START AT $I_2$ — $I_2$ $P_5$ $B_6$ $B_7$ $P_8$ $B_9$ $B_{10}$ $P_{11}$ $B_{12}$ $B_{13}$ $P_{14}$ |
| $B_7$ | START AT $I_2$ — $I_2$ $P_5$ $B_7$ $P_8$ $B_9$ $B_{10}$ $P_{11}$ $B_{12}$ $B_{13}$ $P_{14}$ |
| $P_8$ | START AT $I_2$ — $I_2$ $P_5$ $P_8$ $B_9$ $B_{10}$ $P_{11}$ $B_{12}$ $B_{13}$ $P_{14}$ |
| $B_9$ | START AT $I_2$ — $I_2$ $P_5$ $P_8$ $B_9$ $B_{10}$ $P_{11}$ $B_{12}$ $B_{13}$ $P_{14}$ |
| $B_{10}$ | START AT $I_2$ — $I_2$ $P_5$ $P_8$ $B_{10}$ $P_{11}$ $B_{12}$ $B_{13}$ $P_{14}$ |
| $P_{11}$ | START AT $I_2$ — $I_2$ $P_5$ $P_8$ $P_{11}$ $B_{12}$ $B_{13}$ $P_{14}$ |
| $B_{12}$ $B_{13}$ | START AT $I_2$ IN NEXT GOP |
| $P_{14}$ | START AT $I_2$ IN NEXT GOP |

*FIG. 6*

EDIT TO PICTURE WITHOUT DECODING AND RE-ENCODING OF MPEG BIT STREAM FOR RECORDABLE DVD

CROSS REFERENCE TO RELATED APPLICATIONS

This application claims priority of U.S. provisional patent application No. 60/164,793 filed date Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD–RW and DVD+RW. As of this time no uniform industry standard has been adopted. The acronyms DVD-RAM, DVD–RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and without any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

It is desirable for any recordable DVD device to have some editing features. Consumers demand such features in order to make their own home videos for special events such as weddings, birthday parties and so on. Such features are also useful after recording a TV program. For example, a consumer may wish to erase commercials from certain programs, for example sports events and movies.

In an MPEG bit stream, the smallest access unit is a group of pictures or GOP. In DVD the smallest access unit is a VOBU. Each VOBU is nominally comprised of a group of pictures (GOP). As such, normal MPEG editing only edits to a GOP without decoding and re-encoding the MPEG encoded signal at a picture level. Thus, most editors today are functionally limited in terms of resolution to a minimum of GOP editing, which is around 0.5 second resolution. In these types of conventional systems, users cannot arbitrarily define beginning and ending points at a picture level of resolution for the purpose of marking bit-stream segments upon which editing operations are to be performed. In any case, the result is that an edit may be displaced as much as 0.5 seconds from the beginning and ending points selected by a user.

In general, the foregoing limitation is attributable to the complexity associated with decoding and re-encoding the DVD video data to the level of a single picture. DVD video is highly compressed in order to make maximum use of available disc space. The compression technique most commonly used essentially involves storing a single picture in full detail and subsequently storing only changes associated with subsequent images. The technique uses three kinds of pictures which are commonly referred to as Intra pictures (I pictures), Predicted pictures (P pictures) and Bidirectional pictures (B pictures). I pictures are reference pictures in which the entire picture content is compressed and stored. I pictures are treated as reference pictures from which other pictures can be assembled. I pictures can be directly accessed within a video stream as they contain all of the data needed to reproduce the picture. By comparison, P pictures cannot independently be used to reproduce a picture. Instead, such pictures contain motion vectors which describe differences from the closest previous I picture or P picture. Finally, B pictures are encoded by looking forward and backward to the next I or P picture to match macroblocks forming these I and P pictures.

The following is a typical GOP structure of 15-picture GOP in display order without detelecine: $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $P_{14}$. However, other GOP structures are possible and can be used as well. Regardless of the precise GOP structure used, B pictures cannot be randomly accessed as such pictures cannot be properly decoded without the surrounding I pictures and P pictures. Similarly, the P pictures cannot be properly decoded without reference to the most immediately preceding I picture within the bit stream. This difficulty creates special problems for implementing editing functions in recordable DVD as it means that certain pictures within the bit stream cannot practically be separated from the surrounding pictures.

SUMMARY OF THE INVENTION

A method is disclosed for editing to a picture a group of pictures (GOP) in a DVD media without decoding and encoding of an MPEG encoded signal including the steps of:

marking a user selected end picture to identify a selected segment of the encoded signal to be edited; automatically identifying an actual end picture for the selected segment based on a position of the user selected end picture relative to at least one other picture within the encoded signal; and performing an edit function on an actual segment delimited by the actual end picture.

The identifying step with respect to the actual end picture is includes assigning the actual end picture to be at least one of an I picture and a P picture most nearly adjacent to the user selected picture if the user selected end picture is not at least one of an I picture and a P picture. The method can also include the step fo blanking the actual end picture and deleting any B pictures appearing between the user selected end picture and the actual end picture. According to one aspect the step of identifying the actual end picture includes assigning the actual end picture to be the user selected end picture if the user selected end picture is an I picture or a P picture.

The method can further include the steps of marking a user selected start picture to identify a selected segment of the encoded signal to be edited; and automatically identifying an actual start picture for the selected segment based on a position of the user selected start picture relative to at least one other picture within the encoded signal. The identifying step with respect to the start picture can include assigning the actual start picture to be an I picture most immediately preceding the user selected picture if the user selected picture is a B picture or P picture. Further, the method can include the step of deleting any B pictures appearing between the user selected picture and the actual start picture. In this regard, the method can also include the step of blanking any I picture and any P picture appearing between the user selected picture and the actual start picture.

According to one aspect, the identifying step with respect to the actual start picture can include assigning the actual start picture to be the user selected start picture if the user selected start picture is an I picture. According to another aspect, the identifying step with respect to the actual start picture can include assigning the actual start picture to be an I picture in a subsequent GOP if the user selected picture is within about the last two pictures of a GOP containing the selected picture.

In an alternative embodiment, the invention can include a rewritable DVD device for editing to a picture a group of pictures (GOP) in a DVD media without decoding and encoding of an MPEG encoded signal. The device is responsive to a user input for marking a user selected end picture to identify a selected segment of the encoded signal to be edited; automatically identifies an actual end picture for the selected segment based on a position of the user selected end picture relative to at least one other picture within the encoded signal; and provides editing functions for performing an edit function on an actual segment delimited by the actual end picture.

The rewritable DVD device defines the actual end picture to be at least one of an I picture and a P picture most nearly adjacent to the user selected picture if the user selected end picture is not at least one of an I picture and a P picture. The device can blank the actual end picture and deletes any B pictures appearing between the user selected end picture and the actual end picture. The system can also define the actual end picture to be the user selected end picture if the user selected end picture is an I picture or a P picture.

The device can also be responsive to a user input for marking a user selected start picture to identify a selected segment of the encoded signal to be edited; and can automatically identify an actual start picture for the selected segment based on a position of the user selected start picture relative to at least one other picture within the encoded signal. The device defines the actual start picture to be an I picture most immediately preceding the user selected picture if the user selected picture is a B picture or P picture. The device can also delete any B pictures appearing between the user selected picture and the actual start picture. The device can also blank any I picture and any P picture appearing between the user selected picture and the actual start picture.

According to one aspect, the rewritable DVD device identifies the actual start to be the user selected start picture if the user selected start picture is an I picture. Alternatively, the rewritable DVD device can identify the actual start picture to be an I picture in a subsequent GOP if the user selected picture is within about the last two pictures of a GOP containing the selected picture.

DETAILED DESCRIPTION OF THE PREFERRED EMBODIMENTS

Recordable DVD Device

Figure 1:
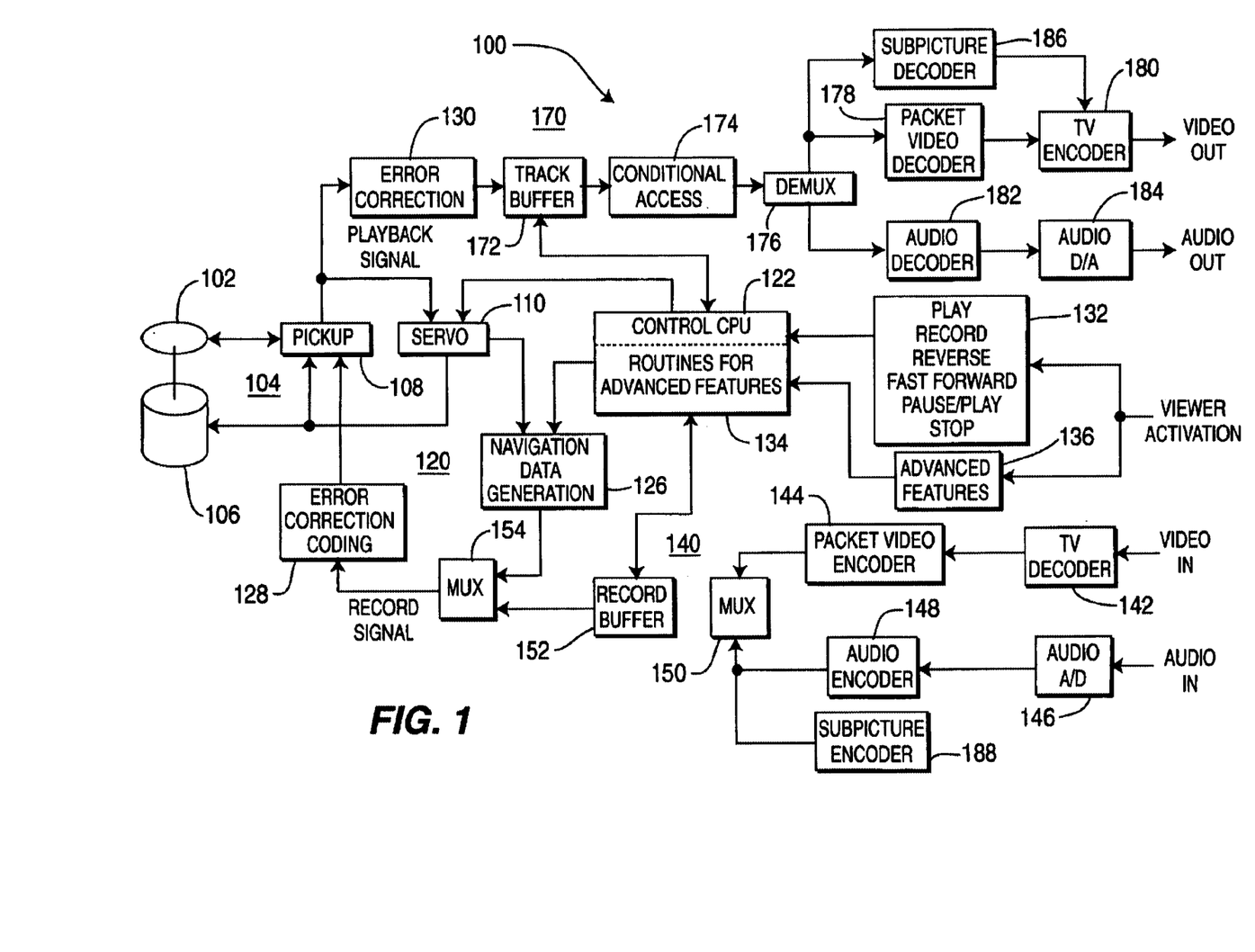
FIG. 1 is a block diagram of a rewritable DVD device that can be provided with one or more advanced operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128.

The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152 for the purpose of implementing the inventive arrangements.

Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. A subpicture encoder 188 is provided for generating subpicture information to be inserted into the data stream. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing.

Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL in TV encoder 180. The audio is decoded by circuit 182, for example from MPEG-1 or MPEG-2, and converted to analog form by audio digital-to-analog (D/A) converter 184. Finally, the subpicture information which has been read from the disc is decoded by circuit 186. The output processing path 170 can be deemed to include the error correction circuit 130, as noted.

DVD Media

Figure 2:
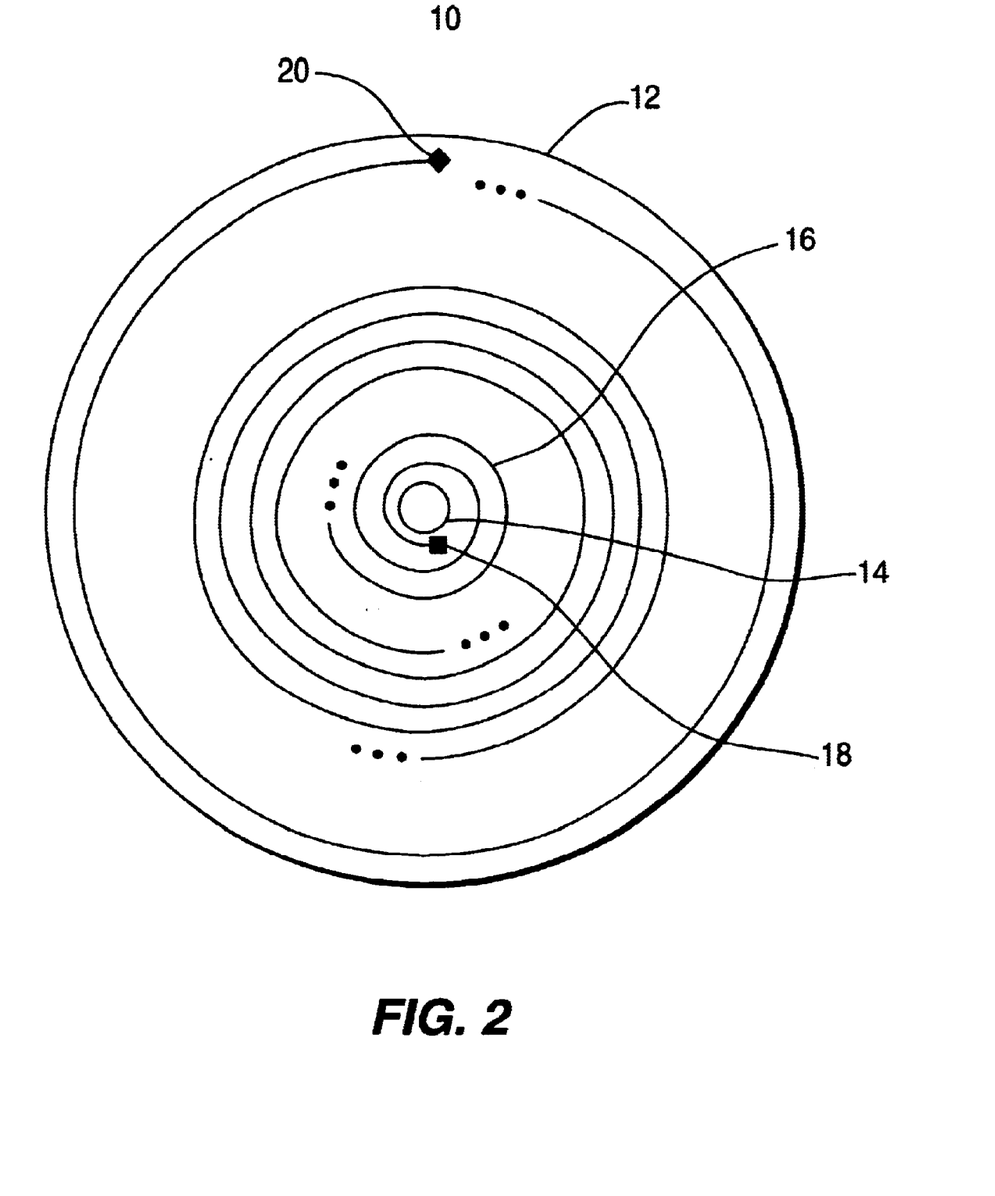
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 if formed by a flat, round plastic plate-like member 12 having a hole 14 in the middle. The direction of recording on the track is typically outwardly along a spiral track 16, from a smaller radius part of the spiral to a larger radius part of the spiral. The several series of three large dots ( . . . ) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advance features in accordance with the inventive arrangements utilize backward recording, that is, from a larger radius part of the spiral to a smaller radius part of the spiral. The track can also have a side-to-side wobble, not shown in the drawing, to accommodate media type indexing.

Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

Various modifications of the device illustrated in FIG. 1 and the disc medium illustrated in FIG. 2 can be used together to implement the advanced features taught herein in accordance with the inventive arrangements. It will be appreciated that the advanced features taught herein are applicable to other kinds of disc media and disc media players and recorders.

Figure 3:
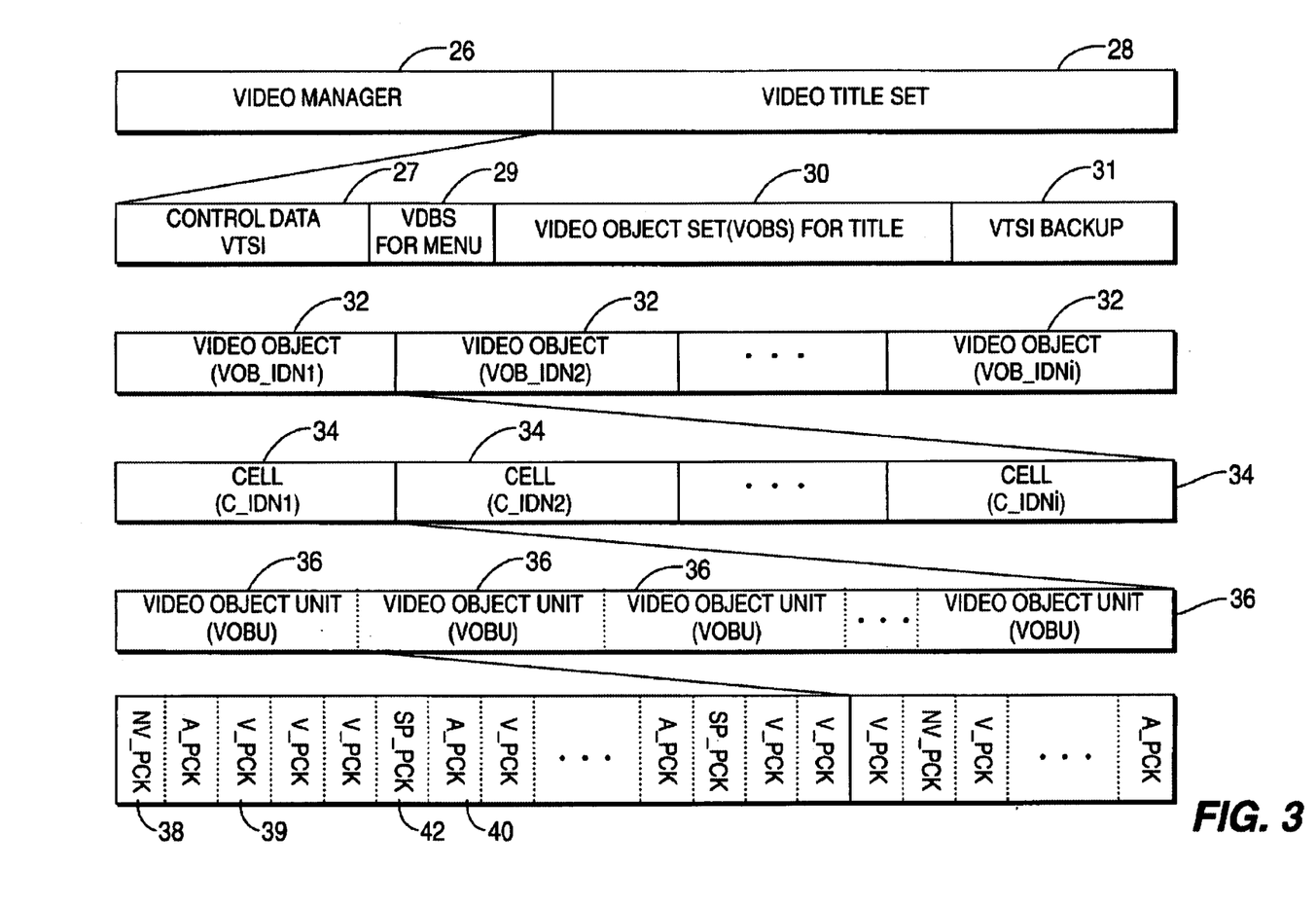
FIG. 3 is a diagram useful for explaining the organization of video disc.

As shown in FIG. 3, each DVD contains a video manager 26 and video title set (VTS) 28. The VTS includes video title set information (VTSI) 27, an optional video object set for menu 29, and one or more VOBS for title 30 which contains the actual title content. Each VOBS 30 is comprised of a plurality of video objects 32. Each video object 32 includes a plurality of cells 34. Each VOBS is comprised of a collection of pointers to cells. In this way, the VOBS data links cells together and indicates in what order the programs or cells are to be played. Cells within a particular VOBS can be flagged for play in any desired order. For example, they can be played sequentially or randomly.

Each cell includes a plurality of VOBUs 36. Each of the VOBUs 36 in which the video content of the disc resides typically contains 0.4 to 1.0 seconds of presentation material. Each VOBU 36 is a sequence of data packs in recording order. Each VOBU starts with exactly one navigation pack (NV_PCK) 38 and could encompass all of following kinds of packs, including video packs (V_PCK) 39, audio packs (A_PCK) 40 and sub-picture packs (SP_PCK) 42.

The NV_PCK 38 contains presentation control information as well as data search information. The data search information is useful in performing "trick" modes of playback, that is, modes in which some subset of the total pictures are presented in order to achieve a faster presentation of the material. One aspect of data search information (DSI) is that it helps the decoder to find reference pictures within the VOBU corresponding to the current NV_PCK. Another aspect of the DSI is that it helps the decoder to find VOBUs far into the future or past of presentation, relative to the current VOBU. The VOBUs in the past relative to the current VOBU presentation are referenced in fields of the NV_PCK known as the BWDI (backward information). The VOBUs in the future relative to the current VOBU presentation are referenced in fields of the NV_PCK known as FWDI (forward information).

Each VOBS can include navigation commands which permit branching or other interactive features. These navigation commands can be included as part of the VOBS as a set of pre-commands. These pre-commands can be followed by optional navigation commands identified within the NV_PCK 38 of the cells 34, which commands are executed after the cell is presented. Finally these may be followed in the VOBS by an optional set of post-commands. All of these commands are stored in a table within the VOBS and can be referenced by number so that they can be used repeatedly. The navigation commands can direct the control CPU 122 to perform a variety of operations associated with branching or interactive features. For example, they can provide flow control with commands such as goto, link, jump, exit, and so on.

Figure 3A:
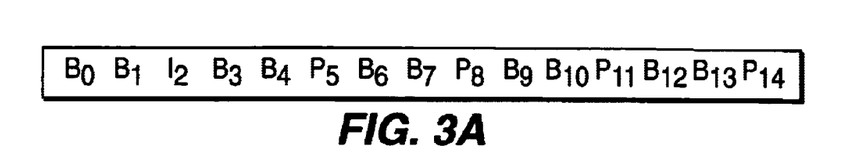
FIG. 3A is a typical GOP structure of a 15 picture GOP in display order useful for explaining the edit to picture process.

Edit to Picture Without Decoding and Re-Encoding of MPEG Bit Stream for Recordable DVD A method in accordance with the inventive arrangements provides picture editing to a picture within a group-of-pictures (GOP) and VOBU on a DVD disk. FIG. 3A is a typical GOP structure of 15-picture GOP in display order without detelecine. The invention is described relative to a typical 15-picture GOP structure. However, it should be readily apparent that the process could also be used with other GOP structures, such as a 12-picture GOP (M=1 or 2).

For the purpose of performing a video edit, a user will commonly need to identify a segment of the bit-stream upon which the editing operation (e.g. delete) is to be performed. This presents a special problem in that certain of the pictures such as B pictures cannot be decoded without reference to I pictures and P pictures which come immediately before and after such B pictures in the bit stream. Similarly, P pictures cannot be decoded without preceding I pictures.

The inventive arrangements provide a unique approach to solving the foregoing problem. The process begins when a user marks a beginning and an end point defining a segment to which an editing operation is to be performed. The precise picture beginning and ending locations in the presentation which have been marked by the user may correspond to a B picture or P picture which cannot be decoded independently of surrounding pictures. In that case, the system automatically chooses new beginning and start pictures as necessary upon which will define the actual segment upon which the edit operation will be performed. This selection transformation is illustrated in FIGS. 4–6.

Figure 4:
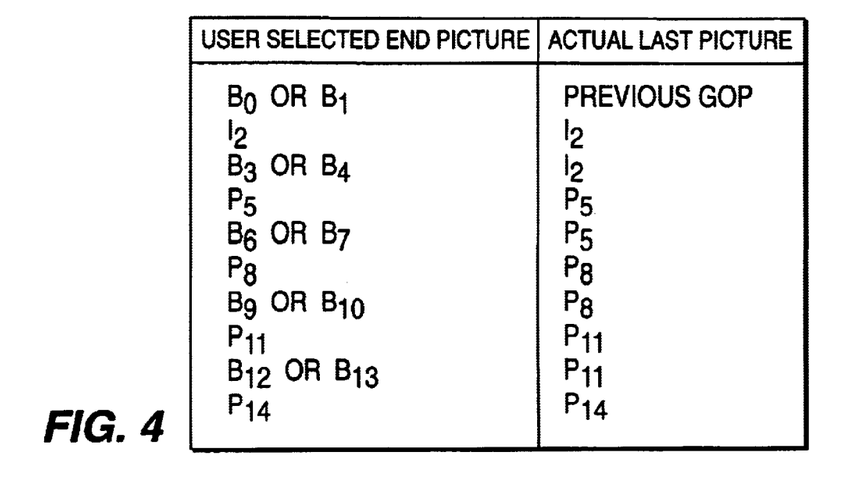
FIG. 4 is an end picture transformation table useful for explaining the edit to picture process.
Figure 5:
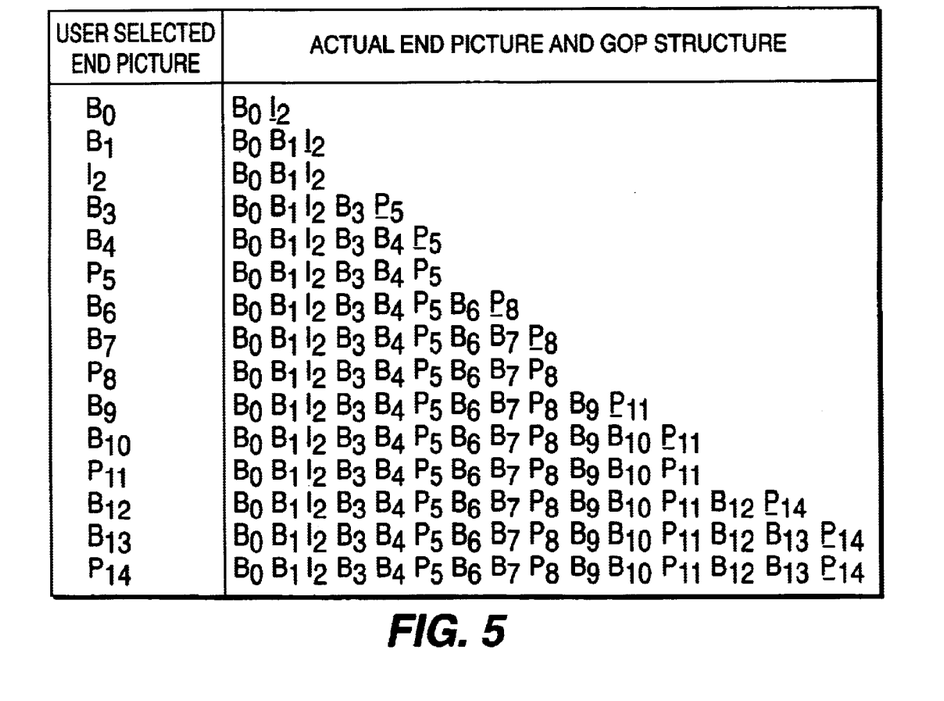
FIG. 5 is an end picture transformation table useful for explaining an alternative embodiment of the edit to picture process.
Figure 6:
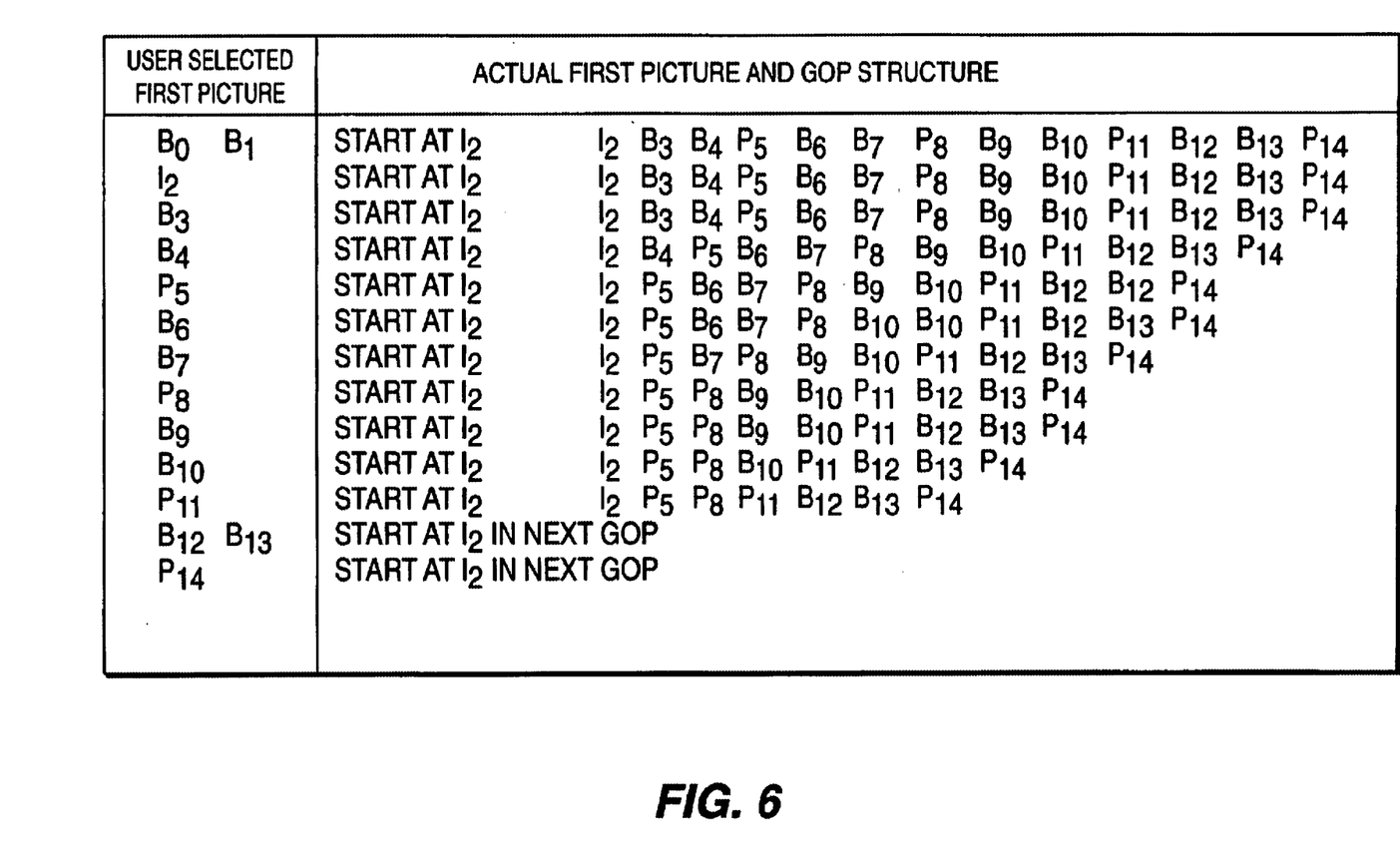
FIG. 6 is a start picture transformation table useful for explaining the edit to picture process for an open GOP.
Figure 7:
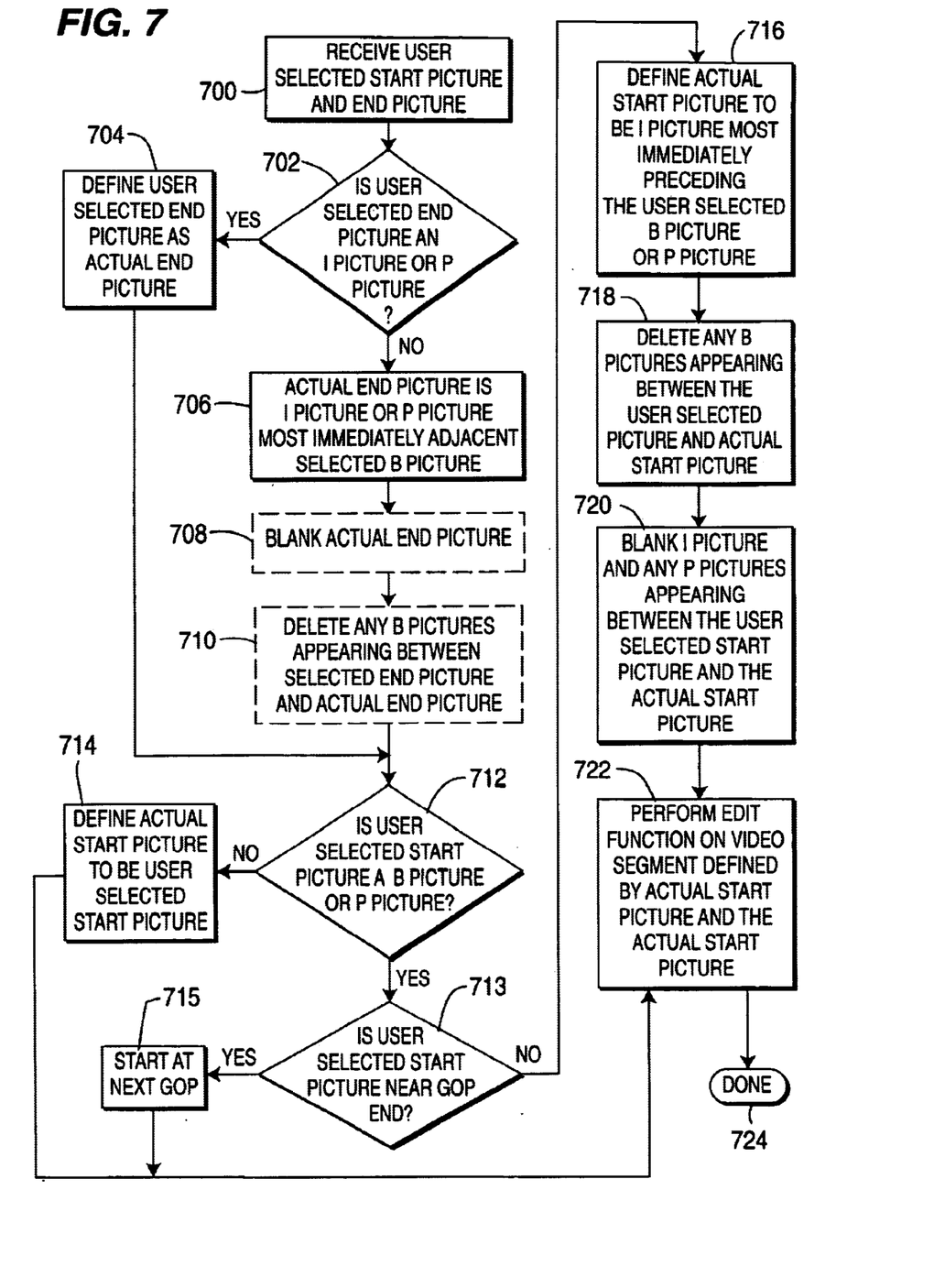
FIG. 7 is a flow chart useful for explaining the edit to picture process.

FIG. 7 is a flow chart illustrating a process according to the inventive arrangements with reference to FIG. 3A and FIGS. 4–6. The process begins in step 700 when a user selects a start picture and an end picture which define a video segment upon which an editing operation is to be performed. This selection process can be performed by any suitable means which allows the user to mark as segment of the video presentation. In step 702, if the user selected end picture of an edit segment is determined to be an I picture or P picture, then the system will proceed to step 704 and that user selected end picture will be used as the actual end picture. However, if the end picture is a B picture, then the system automatically chooses a new last picture which is the I picture or P picture most immediately before or after the user selected B picture. FIG. 4 illustrates a transformation table in which the system automatically chooses the new last picture to be the I or P picture most immediately before the user selected B picture. FIG. 5 illustrates a transformation table in which the system automatically chooses the new last picture to be the I or P picture most immediately after the user selected B picture. If the transformation table of FIG. 4 is used, then the process can proceed directly from step 706 to step 712. If the transformation table of FIG. 5 is used, then additional processing is required in step 708 and 710.

If the system is configured in step 706 to use the I picture or P picture that appears after the user selected B picture, then the system preferably adds a sub-picture to the picture in step 708 so that the subsequent I picture or P picture appears blank during display or playback. In FIG. 5, the I pictures and P pictures to be blanked are shown underlined. In step 710, any B pictures appearing between the selected end picture and the actual end picture are deleted. For example, in FIG. 5, where the user selected last picture is $B_3$, then the $B_4$ picture is deleted.

In step 712, if the first picture defining the segment as selected by the user is not a B picture or a P picture, then it must be an I picture. Accordingly, the system in step 714 defines the actual start picture to be the I picture which is the selected start picture. The process then proceeds to step 722.

In step 713, if a user selected start picture marking the beginning of an edit segment falls toward the end of a GOP (e.g. $B_{12}$, $B_{13}$) then this GOP is preferably skipped entirely. Thus, the system will proceed to step 715 and the actual start picture would preferably be deemed to be the first I picture of the next GOP. The process then proceeds to step 722.

If the user selected start picture is determined in step 713 not to be a picture which falls toward the end of a GOP, then the system proceeds to step 716. In step 716, the system automatically chooses a new start picture to be the I picture most immediately preceding the user selected B picture. This new start picture is then deemed to be the actual start picture defining the beginning of the segment.

FIG. 6 illustrates the foregoing process for selecting a new start picture in step 716 relative to the typical GOP structure shown in FIG. 3A. According to a preferred embodiment, any intermediate B pictures appearing between the user selected picture and the actual start picture are deleted in step 718. The pictures can be deleted by one of the following ways: (1) deleting the MPEG bit stream data; (2) using stuffing bytes, such as 00 or FF, to replace the MPEG data; (3) using padding stream start code (00 00 01 BE) and 2-byte padding data length; or, setting PES_packet_length to zero if the whole pack will be deleted. In step 720, the I picture and any intermediate P pictures are preferably made blank during display by a adding an appropriately configured sub-picture. In FIG. 6, blanked pictures are shown underlined. Significantly, the foregoing approach allows the user selected first picture to be displayed, without necessarily displaying the preceding I pictures and P pictures which are otherwise necessary to decode the B picture. In step 722 the edit function can be performed on the video segment defined by the actual start picture and actual end picture. The process is completed in step 724.

Picture blanking as described herein can be accomplished in a variety of different ways. For example, a sub-picture can be used to blank a main picture by setting the sub-picture size to be equal to the main picture, setting the gray level of the sub-picture to blank, setting the color of the sub-picture to no color, setting the contrast to 16 (solid), and setting the display start time for the subpicture to be the same as the presentation time of the main picture. If the sub-picture is to blank more than one picture, the display time is set as the total presentation time for all of the pictures to be blanked.

For editing film structure, it is necessary to make sure that the interlaced top field and bottom field are matched. If they are not matched, they can be made to match by either adding a repeat first field or deleting a repeat field with regard to either the actual start picture or actual end picture.

Audio may or may not be associated with the edited video. If audio is associated with the video, there will be lip sync problem. In order to solve the lip sync problem, some audio pictures have to be deleted, or some or all of the associated audio packs in the VOBU must be silenced by setting the audio_mute_flag.

Line 21 data, for example closed captioning, is associated with display fields of a GOP. The line 21 data is in the GOP header user-data field. Because some fields have been deleted, some closed caption data may not be valid. In order to prevent closed caption error, the line 21 data needs to be altered or deleted.

It will be readily appreciated by those skilled in the art that the foregoing inventive arrangement for editing a GOP to the level of individual pictures is not limited to the precise embodiments disclosed herein. In fact, the inventive arrangements can be used not only with DVD media, but also with any other media utilizing an MPEG compression scheme.

We claim:

1. A method for editing to a picture a group of pictures (GOP) in a media without decoding and encoding of an MPEG encoded signal comprising the steps of:

marking at least a user selected end picture to identify a selected segment of said encoded signal to be edited;

automatically identifying an actual end picture for said selected segment based on a position of said user selected end picture relative to at least one other picture within said encoded signal by assigning said end picture to be at least one of an I picture and a P picture most nearly adjacent to said user selected picture if said user selected end picture is not at least one of an I picture and a P picture;

performing an edit function on an actual segment delimited by said actual end picture; and blanking said actual end picture.

2. The method according to claim 1 further comprising blanking said actual end picture.

3. The method according to claim 1 wherein said identifying step with respect to said actual end picture is comprised of:

assigning said actual end picture to be said user selected end picture if said user selected end picture is at least one of an I picture and a P picture.

4. The method according to claim 1 further comprising marking a user selected start picture to identify a selected segment of said encoded signal to be edited;

automatically identifying an actual start picture for said selected segment based on a position of said user selected start picture relative to at least one other picture within said encoded signal.

5. The method according to claim 4 wherein said identifying step with respect to said actual start picture is comprised of:

assigning said actual start picture to be an I picture most immediately preceding the user selected picture if the user selected picture is a B picture or P picture.

6. The method according to claim 5 further comprising the step of deleting any B pictures appearing between said user selected picture and said actual start picture.

7. The method according to claim 6 further comprising the step of blanking any I picture and any P picture appearing between said user selected picture and said actual start picture.

8. The method according to claim 5 wherein said identifying step with respect to said actual start picture is comprised of assigning said actual start picture to be said user selected start picture if said user selected start picture is an I picture.

9. The method according to claim 4 wherein said identifying step with respect to said actual start picture is comprised of assigning said actual start picture to be an I picture in a subsequent GOP if said user selected picture is within about the last two pictures of a GOP containing said selected picture.

10. A rewritable DVD device for editing to a picture a group of pictures (GOP) in a media without decoding and encoding of an MPEG encoded signal comprising:

marking means responsive to a user input for marking at least a user selected end picture to identify a selected segment of said encoded signal to be edited;

processing means for automatically identifying an actual end picture for said selected segment based on a position of said user selected end picture relative to at least one other picture within said encoded signal, including means for assigning said end picture to be at least one of an I picture and a P picture most nearly adjacent to said user selected picture if said user selected end picture is not at least one of an I picture and a P picture; and editing means for performing an edit function on an actual segment delimited by said actual end picture; and means for blanking said actual end picture.

11. The rewritable DVD device according to claim 10 further comprising means for deleting any B pictures appearing between said user selected end picture and said actual end picture.

12. The rewritable DVD device according to claim 10 wherein said processing means for identifying said actual end picture is comprised of:
   means for assigning said actual end picture to be said user selected end picture if said user selected end picture is at least one of an I picture and a P picture.

13. The rewritable DVD device according to claim 10 further comprising means responsive to a user input for marking a user selected start picture to identify a selected segment of said encoded signal to be edited;
   processing means for automatically identifying an actual start picture for said selected segment based on a position of said user selected start picture relative to at least one other picture within said encoded signal.

14. The rewritable DVD device according to claim 13 wherein said processing means for identifying said actual start picture is comprised of:
   means for assigning said actual start picture to be an I picture most immediately preceding the user selected picture if the user selected picture is a B picture or P picture.

15. The rewritable DVD device according to claim 14 further comprising means for deleting any B pictures appearing between said user selected picture and said actual start picture.

16. The rewritable DVD device according to claim 14 further comprising means for blanking any I picture and any P picture appearing between said user selected picture and said actual start picture.

17. The rewritable DVD device according to claim 13 wherein said processing means for identifying said actual start picture is further comprised of means for assigning said actual start picture to be said user selected start picture if said user selected start picture is an I picture.

18. The rewritable DVD device according to claim 13 wherein said processing means for identifying said actual start picture is comprised of means for assigning said actual start picture to be an I picture in a subsequent GOP if said user selected picture is within about the last two pictures of a GOP containing said selected picture.

* * * * *

UNITED STATES PATENT AND TRADEMARK OFFICE
CERTIFICATE OF CORRECTION

PATENT NO. : 6,707,778 B1  Page 1 of 1
DATED : March 16, 2004
INVENTOR(S) : Shu Lin, Mark Alan Schultz and Yongmei Cang It is certified that error appears in the above-identified patent and that said Letters Patent is hereby corrected as shown below:

Title page,
Item [56], References Cited, OTHER PUBLICATIONS, add the following:
-- Hedtke, R. et al. "Schnittbearbeitung Von MPEG - 2 - CODIERTEN VIDEOSQUENZEN" FERNSEH UIND KINOTECHNIK, VDE VERLAG GMBH.BERLIN, DE. Vol. 50 No. 7, JULY 1996
HURST, R. et al.: "MPEG Splicing - Tutorial and Proposed SMPTE Standard PROCEEDINGS OF THE SMPTE TECHNICAL CONFERENCE, XX, XX, November 1997. --

Signed and Sealed this

Eighteenth Day of January, 2005

JON W. DUDAS
*Director of the United States Patent and Trademark Office*